(12) United States Patent
Wallmeier

(10) Patent No.: US 8,767,427 B2
(45) Date of Patent: Jul. 1, 2014

(54) ARRANGEMENT FOR POWER SUPPLY FOR A REACTOR FOR PRODUCTION OF POLYSILICON WITH A FREQUENCY CONVERTER

(75) Inventor: Peter Wallmeier, Lippstadt (DE)

(73) Assignee: AEG Power Solutions B.V., Zwanenburg (NL)

( * ) Notice: Subject to any disclaimer, the term of this patent is extended or adjusted under 35 U.S.C. 154(b) by 0 days.

(21) Appl. No.: 13/439,164

(22) Filed: Apr. 4, 2012

(65) Prior Publication Data

US 2013/0020869 A1  Jan. 24, 2013

(30) Foreign Application Priority Data

Jul. 19, 2011  (EP) ...................................... 11174546

(51) Int. Cl.
*H02M 5/00* (2006.01)
*H02J 3/14* (2006.01)

(52) U.S. Cl.
USPC ............................................ 363/157; 307/31

(58) Field of Classification Search
USPC ............ 363/17, 34–37, 98, 132, 157; 307/18, 307/25–31
See application file for complete search history.

(56) References Cited

U.S. PATENT DOCUMENTS

| | | | | |
|---|---|---|---|---|
| 4,562,338 A | * | 12/1985 | Okami | 219/503 |
| 2006/0061295 A1 | * | 3/2006 | Vollmar et al. | 315/219 |
| 2006/0113968 A1 | * | 6/2006 | Flockerzi | 323/201 |
| 2007/0273213 A1 | * | 11/2007 | Wang et al. | 307/66 |
| 2007/0297204 A1 | * | 12/2007 | Lu et al. | 363/131 |
| 2008/0179952 A1 | * | 7/2008 | Vollmar et al. | 307/31 |
| 2009/0174377 A1 | * | 7/2009 | Schrom et al. | 323/272 |
| 2010/0244575 A1 | * | 9/2010 | Coccia et al. | 307/82 |
| 2011/0169332 A1 | * | 7/2011 | Wallmeier | 307/31 |
| 2011/0273013 A1 | * | 11/2011 | Wallmeier et al. | 307/29 |
| 2011/0286580 A1 | * | 11/2011 | Beland | 378/111 |
| 2013/0019802 A1 | * | 1/2013 | Leck | 118/724 |
| 2013/0113444 A1 | * | 5/2013 | Schrom et al. | 323/247 |

FOREIGN PATENT DOCUMENTS

| EP | 2 100 851 A2 | 9/2009 |
|---|---|---|
| EP | 2 346 150 A1 | 7/2011 |

* cited by examiner

*Primary Examiner* — Timothy J Dole
*Assistant Examiner* — Yusef Ahmed
(74) *Attorney, Agent, or Firm* — Cohen & Hildebrand, PLLC

(57) ABSTRACT

A power supply arrangement (MF) for a reactor (R) for producing polysilicon, with a frequency converter, with at least one input for receiving an input current from the supply grid with which the input is connected, and outputs for connecting one or several loads (3), via which the load(s) (3) can be supplied with an output current, wherein the power supply arrangement has a transformerless conversion circuit for converting the input current into an n-phase multiphase AC current, wherein the phase shift between chained voltages of an n-phase AC current system formed on the secondary side of the conversion circuit is 360°/n, wherein n is a natural number greater than or equal to two, wherein the supply arrangement (MF) has n outputs, wherein the outputs from a chain, and wherein one of the chained voltages of the n-phase AC current system is applied at each output.

13 Claims, 2 Drawing Sheets

Figure 1:
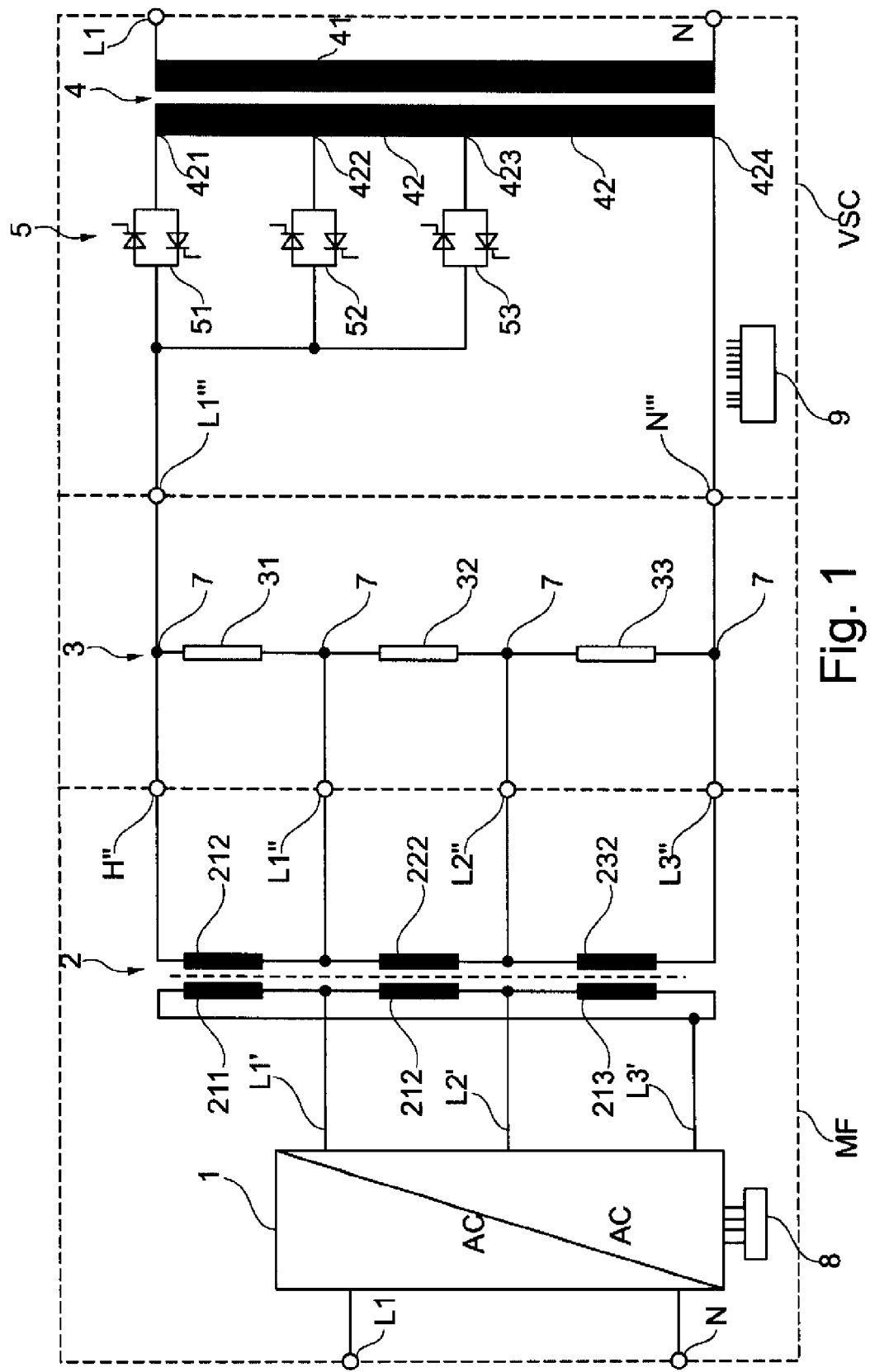

ARRANGEMENT FOR POWER SUPPLY FOR A REACTOR FOR PRODUCTION OF POLYSILICON WITH A FREQUENCY CONVERTER

BACKGROUND OF THE INVENTION (1) Field of the Invention

The present invention relates to a power supply arrangement for a reactor for producing polysilicon, with a frequency converter, with at least one input for receiving an input current from a power grid, with which the input can be connected, and outputs for connecting one or several loads, via which the load or the loads can be supplied with an output current.

(2) Description of Related Art

The document EP 2 100 851 A2 discloses power supply arrangements which include frequency converters and which can be supplied with electrical energy from a single-phase power grid. Loads can be connected to the power supply arrangements with the frequency converters, for example silicon rods of a silicon reactor for producing polysilicon by vapor deposition according to the Siemens process.

FIG. 3 of the document EP 2 100 851 A2 shows that electrical energy is supplied to two loads connected in series separately from corresponding power supply arrangements with the frequency converters, wherein the power supply arrangements with a frequency converters are each configured single-phase. The phase between the currents provided by the power supply arrangements is 180°. The added voltages provided by the two power supply arrangements with frequency converters therefore cancel each other.

Power supply arrangements with frequency converters are described in the European patent applications having the application numbers 10 150 728 and 11 164 316 which were filed after the filing date of the present application, which have an output connected to a transformer having a primary winding and two secondary windings. The two secondary windings each have the same number of turns. However, they have the opposite winding sense. A voltage having the same magnitude but opposite polarity is then present at the outputs of the secondary windings. The secondary windings are connected to each other, with the connection forming a neutral conductor and the two ends of the secondary coils forming phase conductors of a two-phase AC current system which supplies a voltage to the connected loads.

The loads are each connected to at least conductor and to the neutral conductor of the two-phase AC current system.

The power supply arrangements with a frequency converter connected as described in the document EP 2 100 851 A2 and the power supply arrangements with frequency converters described in the applications 10 150 728 and 11 164 316 have the advantage that in addition to supplying the loads from the power supply arrangement having frequency converters, power can be simultaneously supplied from another power supply arrangement, without interference between the power supply arrangements. This approach is also described in the document EP 2 100 851 A2 and in the applications 10 150 728 and 11 164 316.

Disadvantageously, the circuit with two power supply arrangements with a frequency converter described in the document EP 2 100 851 A2 requires two frequency converters are for realizing the two-phase AC current system. Disadvantageously, the power supply arrangements with frequency converters described in the applications 10 150 728 and 11 164 316 require a special transformer with one primary winding and two secondary windings with opposite winding sense for realizing the two-phase AC current system.

Furthermore, the textbook "Leitungselektronische Schaltungen" by Dierk Schröder, ISBN 978-3-540-69300-0 discloses, for example, resonant circuit inverters and AC-AC converters, for example AC-AC converters with DC link energy storage or matrix converter, which are generally capable of providing multiphase AC current, in particular three-phase AC current. However, an application-specific description of the integration of the inverters or AC-AC converters in a power supply arrangement which is suitable or configured for polysilicon reactors is lacking in the textbook.

It is therefore the object of the invention to provide an improved power supply arrangement of the aforementioned type which is more efficient.

BRIEF SUMMARY OF THE INVENTION

This problem was solved with a power supply arrangement having a circuit for converting the input current into an n-phase multiphase AC current, wherein the phase shift between the linked voltage of an n-phase AC current system formed on the secondary side of the conversion circuit is 360°/n and wherein n is a natural number greater than or equal to two, wherein the power supply arrangement has n outputs, wherein the outputs form a chain, and wherein a linked voltage of the n-phase AC current system is applied at each output.

Preferably, the input current of the power supply arrangement is converted by the conversion circuit into a multiphase AC current having at least three phases.

More powerful current supply arrangements with frequency converters are feasible by distributing the input current, which is typically derived from a three-phase AC current system or from a single-phase AC current system, over an n-phase AC current system. A power supply arrangement according to the invention is capable of supplying a greater number of the loads compared to conventional power supply arrangements known from the document EP 2 100 851 A2, while simultaneously reducing the number of switching components. The current supply arrangement according to the invention has the additional advantage of attaining higher power factors.

The circuit for converting the input current into an n-phase multiphase AC current may include an AC-AC converter preferably equipped with high-power electronic components, such as thyristor, triacs, IGBTs, in particular RC-IGBTs or RB-IGBTs, in particular an AC-AC converter with DC link circuit energy storage or a matrix converter. The AC-AC converter or the inverter is preferably suitable and configured for generating an n-phase multiphase AC current. In contrast to the power supply arrangement described in the applications 10 150 728 and 11 164 316, the input current can be converted transformerless to an n-phase multiphase AC current.

The conversion circuit may include an AC-AC converter, in particular an AC-AC converter with DC link energy storage or a matrix converter. With the AC-AC converter with DC link energy storage, in particular an AC-AC converter with a capacitor may be used as DC link energy storage. Direct matrix converters (e.g. conventional matrix converters [CMC], matrix converters with full bridge circuit) and indirect matrix converters (e.g. AC/DC-DC/AC converters without DC link capacitor, conventional indirect matrix converters [IMC], sparse matrix converters [SMC, VSMC, USMC] may be used as matrix converters.

Also feasible, however not as advantageous as a conversion with power electronic semiconductor components, is the conversion with rotating machines.

The conversion circuit may include an inverter, in particular a resonant circuit converter.

Advantageously, the AC-AC converter or the inverter may also include the frequency converter. Conversion of the input current into a multiphase AC current with n phases and increasing the frequency from typically between 50 to 60 Hz to a frequency of, for example, 0.3 to 300 MHz, preferably from 20 MHz to 200 MHz, can then be achieved with a single circuit.

At least one transformer may be connected downstream of the AC-AC converter or of the inverter in order to increase the voltage at the output of the power supply arrangement to a level required for the process to be powered. The transformer is preferably an n-phase transformer.

The primary side of the n-phase transformer may be connected in form of a polygon. Preferably, secondary windings of the n-phase transformer are each connected in parallel to a corresponding output of the power supply arrangement.

An arrangement according to the invention from a first power supply arrangement and from the power supply arrangement according to the invention can be constructed with a power supply arrangement according to the invention, wherein the power supply arrangement according to the invention is subsequently referred to as the second power supply arrangement. Such arrangement includes:

the first power supply arrangement, wherein the first power supply arrangement includes at least one single-phase transformer, a three-phase transformer or an n-phase transformer having at least three taps for each secondary winding, wherein one tap of each secondary winding is connected to a secondary-side neutral conductor and the remaining taps of each secondary winding are each connected via a corresponding power controller with a secondary-side phase conductor, each secondary-side phase conductor is connected to a phase conductor terminal and the neutral conductor is connected to at least one neutral conductor terminal, each phase conductor terminal in conjunction with one of the neutral conductor terminals forms an output of the first power supply arrangement, and between one and n second power supply arrangements, wherein each output of the first power supply arrangement is connected in parallel with the chain or with one of the chains formed from the outputs of the second or one of the second power supply arrangements.

The first power supply arrangement may include a controller which controls the power controllers in the voltage sequence control connected to the taps of a secondary winding, which has previously been described, for example, in a number of patent applications by the company AEG Power Solutions GmbH or a legal predecessor.

Such an arrangement may be used in a reactor for producing polysilicon by vapor deposition according to the Siemens process, which has a reactor vessel in which holders for silicon rods or thin silicon rods are arranged, wherein the holder are electrically connected to the arrangement.

BRIEF DESCRIPTION OF THE SEVERAL VIEWS OF THE DRAWING(S)

Figure 2:
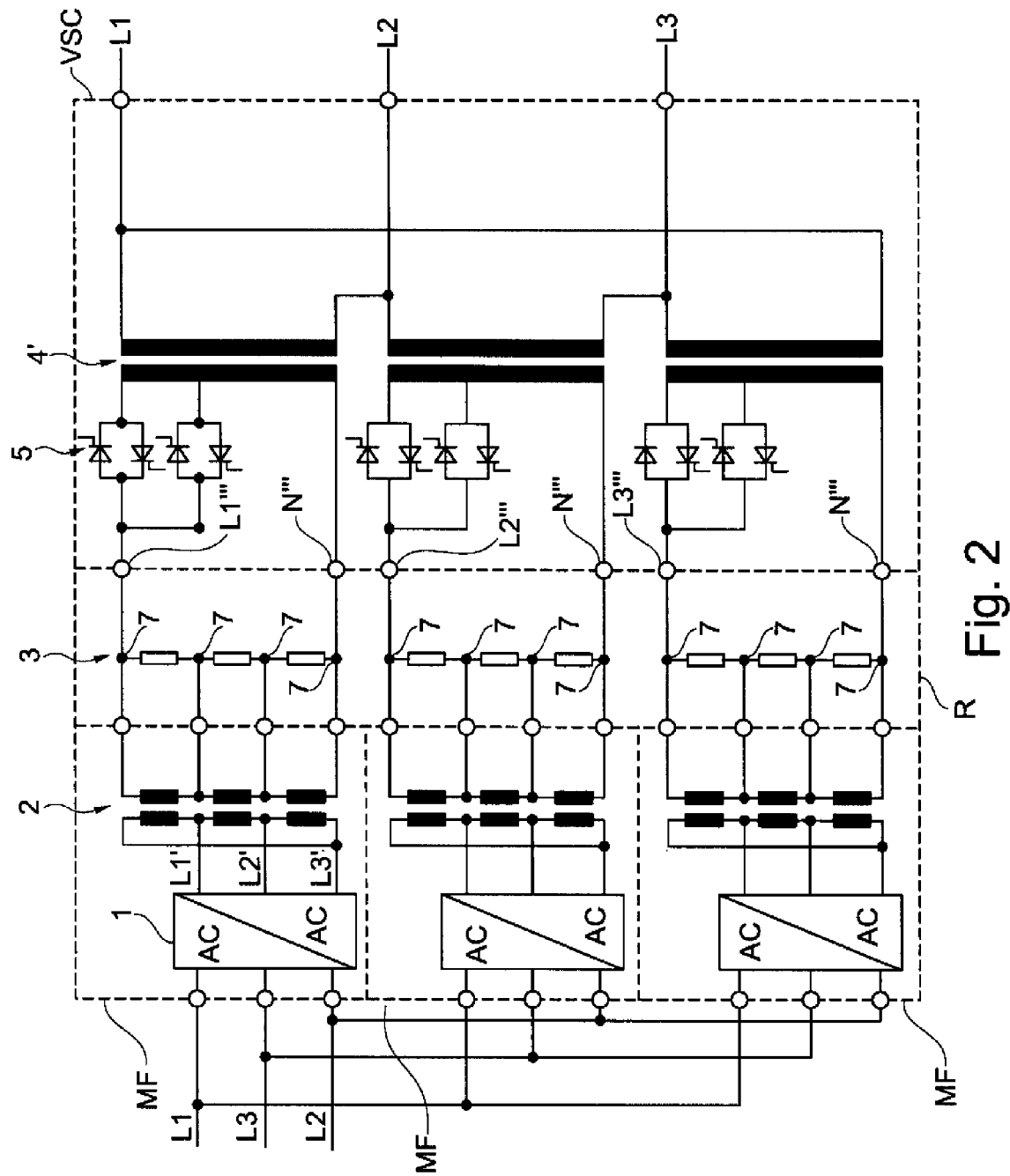

Examples of arrangements and power supply arrangements according to the invention will now be described in more detail with reference to the drawing, in which FIG. 1 shows an arrangement according to the invention which is supplied with electrical energy from a single-phase AC current system, and FIG. 2 shows an arrangement according to the invention which is supplied with electrical energy from a three-phase AC current system.

DETAILED DESCRIPTION OF THE INVENTION

The arrangement according to the invention illustrated in FIG. 1 includes a first power supply arrangement VSC and a second power supply arrangement MF, which are provided in combination for supplying electrical energy to the loads connected to the arrangement. The loads are silicon rods 3, which are arranged in a reactor for producing polysilicon by vapor deposition according to the Siemens process.

Holders 7 which, on one hand, hold the silicon rods 3 and, on the other hand, provide electrical contact between the silicon rods 3 and electrical terminals of the reactor are attached in a reactor vessel of the reactor.

The first power supply arrangement VSC has an input which is connected to a phase conductor L1 and a neutral conductor N of a single-phase AC current system. The first power supply arrangement VSC has a single-phase AC current transformer 4 with a primary winding 41 connected to the input of the first power supply arrangement VSC. A secondary winding 42 of the transformer 4 has four taps 421, 422, 423, 424, wherein three taps 421, 422, 423 of the four taps are connected by way of power controllers 51, 52, 53 with a phase conductor terminal L1''' of an output of the first power supply arrangement. Conversely, the fourth tap 424 is connected to a neutral conductor terminal N''' of the output of the first power supply arrangement VSC. The fourth tap 424 is located at one end of the secondary winding 42.

The power controllers 51, 52, 53 are thyristor power controllers formed by two antiparallel connected thyristors. The power controllers 51, 52, 53 are operated in voltage sequence control.

The voltage sequence control is realized by a controller 9 connected to the thyristors of the power controllers 51, 52, 53 and with additional components to be controlled and/or sensors for measuring current, voltage and the like, which is not illustrated in detail.

The second power supply arrangement MF has also an input which is connected to the phase conductor L1 and the neutral conductor N of the same single-phase AC current system as the first power supply arrangement VSC. The second power supply arrangement MF has an AC-AC converter 1 which is connected to the input of the second power supply arrangement MF.

The AC-AC converter 1 may be a matrix converter converting the single-phase AC current at the input of the AC-AC converter 1 with a frequency of 50 to 60 Hz into a three-phase AC current with a frequency of 20 to 200 MHz. The AC-AC converter 1 is therefore simultaneously a circuit for converting the input current into the three-phase AC currents and a frequency converter. The three-phase AC currents are supplied at the output of the AC-AC converter 1 via three phase conductors L1', L2', L3'.

The output of the AC-AC converter 1 is connected to a three-phase AC current transformer 2 having primary windings 211, 212, 213 connected in a Delta configuration. The secondary windings 212, 222, 232 are connected to terminals H'', L1'', L2'', L3'', which pairwise form outputs of the second power supply arrangements MF. The silicon rods 3 are connected to these outputs, wherein a first silicon rod 31 is connected to the terminals H'', L1'' forming a first output, a second silicon rod 32 is connected to the terminals L1'', L2'' forming a second output, and a third silicon rod 33 is connected to the terminals L2'', L3'' forming a third output of the second power supply arrangement MF. Because of the phase angle of 120° between the phase conductors, there is no voltage drop between H" and the terminal L3" with symmetric loading by the silicon rods 31, 32, 33.

The AC-AC converter 1 is controlled by a controller 8, which is not illustrated in detail.

The terminals H" and L3" can essentially be connected without affecting the second power supply arrangement MF. The secondary windings 31, 32, 33 would then be connected in a Delta configuration. However, no connection between these two terminals H" and L3" is established, because this would also short-circuit the phase conductor terminal L1''' and the neutral conductor terminal N''' of the first power supply arrangement VSC. However, this is not desirable.

Because no voltage drop occurs between the terminals H" and L3" of the second power supply arrangement MF, and therefore also no voltage supplied by the second power supply arrangement MF drops between the terminals L1''', N''' of the output of the first power supply arrangement VSC, the second power supply arrangement MF is unable to drive current into the first power supply arrangement VSC under symmetric loading by the silicon rods 31, 32, 33.

To prevent feedback from the first power supply arrangement VSC to the second power supply arrangement MF, high-pass filters, through which the output voltage from the first power supply arrangement VSC cannot pass, may be installed in the outputs of the second power supply arrangement MF.

The arrangement illustrated in FIG. 1, in particular the second power supply arrangement MF, may be expanded for connecting additional silicon rods to additional outputs. For this purpose, instead of an AC-AC converter with an output for a three-phase AC current system, an AC-AC converter can be used which provides an output for a multiphase AC current system with more than three phases, for example for a four-phase, five-phase or six-phase AC current system.

The arrangement illustrated in FIG. 1 may also be expanded in the manner shown in FIG. 2. The expansions then relate, on one hand, to tripling the second power supply arrangements MF and to expanding the first power supply arrangement VSC to a three-phase power supply arrangement by replacing the single-phase AC current transformer with a three-phase AC current transformer 4' having secondary windings, with the power controllers 5 being connected to the secondary windings in a manner known from the arrangement of FIG. 1 and also being connected to the silicon rods 3. A corresponding second power supply arrangement MF is associated with each output of the first power supply arrangement VSC, as is known from the arrangement of FIG. 1.

The arrangement shown in FIG. 2 can also be expanded, for example by using in the first power supply arrangement VSC a transformer for AC current having more than three phases and/or by using in the second power supply arrangements MF AC-AC converters 1 for converting the input current of the second power supply arrangements into a multiphase AC current.

The invention claimed is:

1. An arrangement comprising:
a first power supply arrangement (VSC), wherein the first power supply arrangement (VSC) comprises at least one single-phase transformer (4), a three-phase transformer (4') or an n-phase transformer having at least three taps (421, 422, 423, 434) for each secondary winding (42), wherein another tap (424) of each secondary winding (42) is connected to a secondary-side neutral conductor and the at least three taps (421, 422, 423) of each secondary winding (42) are each connected via a corresponding power controller (5) with a secondary-side phase conductor, wherein each secondary-side phase conductor is connected to a phase terminal (L1''', L2''', L3''') and the neutral conductor is connected to at least one neutral conductor terminal (N'''), wherein each phase conductor terminal (L1''', L2''', L3''') in conjunction with one of the neutral conductor terminals (N''') forms an output of the first power supply arrangement (VSC), and
between one and n second power supply arrangements (MF)
wherein
the n second power supply arrangement (MF) is configured, comprising:
a transformerless conversion circuit having at least one input for receiving an input current from a supply grid with which the at least one input is connectable, and outputs connectable to at least one load (3) supplied with an output current; the conversion circuit converting the input current into an n-phase AC current, wherein a phase shift between chained voltages of an n-phase AC current system formed on an output side of the conversion circuit is 360°/n, wherein n is a natural number greater than or equal to two,
the power supply arrangement has n outputs,
the outputs of the power supply arrangement form a chain, and one of the chained voltages of the n-phase AC current system is applied on each output,
and
wherein each output of the first power supply arrangement (VSC) is connected in parallel with the chain or with one of the chains formed from the outputs of the second or one of the second power supply arrangements (MF).

2. The current supply arrangement (MF) according to claim 1, wherein n is a natural number greater than or equal to three.

3. The current supply arrangement (MF) according to claim 1, wherein the conversion circuit comprises an AC-AC converter (1).

4. The current supply arrangement (MF) according to claim 3, wherein the AC-AC converter (1) comprises a frequency converter.

5. The current supply arrangement (MF) according to claim 1, wherein the conversion circuit comprises an inverter.

6. The current supply arrangement (MF) according to claim 5, wherein the inverter of the conversion circuit is a resonant circuit converter.

7. The current supply arrangement (MF) according to claim 5, wherein at least one transformer (2) is connected downstream of the inverter.

8. The current supply arrangement (MF) according to claim 5, wherein the inverter comprises a frequency converter.

9. The current supply arrangement (MF) according to claim 1, wherein at least one transformer (2) is connected downstream of the conversion circuit (1).

10. The current supply arrangement (MF) according to claim 9, wherein the transformer (2) is an n-phase transformer.

11. The current supply arrangement (MF) according to claim 10, wherein the n-phase transformer (2) is connected on its primary side in a form of a polygon.

12. The current supply arrangement (MF) according to claim 10, wherein secondary windings (212, 222, 232) of the n-phase transformer (2) are each connected in parallel with a corresponding output of the power supply arrangement (MF).

13. The current supply arrangement (MF) according to claim 1, wherein the conversion circuit comprises an AC-AC converter (1) with DC link energy storage or with a matrix converter.

* * * * *